(12) United States Patent
Reinhard et al.

(10) Patent No.: US 7,824,482 B2
(45) Date of Patent: Nov. 2, 2010

(54) VAPOR PHASE CORROSION INHIBITORS AND METHOD FOR THEIR PRODUCTION

(75) Inventors: Georg Reinhard, Dresden (DE); Urte Ludwig, Dresden (DE); Gerhard Hahn, Hann. Münden (DE)

(73) Assignee: EXCOR Korrosionsforschung GmbH, Dresden (DE)

( * ) Notice: Subject to any disclaimer, the term of this patent is extended or adjusted under 35 U.S.C. 154(b) by 22 days.

(21) Appl. No.: 12/332,475

(22) Filed: Dec. 11, 2008

(65) Prior Publication Data

US 2009/0151598 A1 Jun. 18, 2009

(30) Foreign Application Priority Data

Dec. 12, 2007 (DE) .................. 10 2007 059 726

(51) Int. Cl.
| | |
|---|---|
| C23F 11/00 | (2006.01) |
| C23F 11/02 | (2006.01) |
| C23F 11/04 | (2006.01) |
| C09D 5/08 | (2006.01) |
| B32B 27/18 | (2006.01) |
| B65B 55/19 | (2006.01) |
| B65D 81/26 | (2006.01) |

(52) U.S. Cl. .............. 106/14.13; 106/14.05; 106/14.15; 106/14.41; 106/14.42; 252/388; 524/93; 524/186

(58) Field of Classification Search .............. 106/14.05, 106/14.13, 14.15, 14.41, 14.42; 252/388; 524/93, 186

See application file for complete search history.

(56) References Cited

U.S. PATENT DOCUMENTS

| | | | | |
|---|---|---|---|---|
| 2,419,327 A | * | 4/1947 | Wachter et al. ............. 252/392 |
| 2,432,839 A | * | 12/1947 | Wachter et al. ............. 508/545 |
| 2,432,840 A | * | 12/1947 | Wachter et al. ............. 508/250 |
| 2,534,201 A | | 12/1950 | Hutter | |
| 2,941,953 A | | 6/1960 | Hatch et al. | |
| 2,986,447 A | * | 5/1961 | Raifsnider ...................... 422/8 |
| 3,295,917 A | | 1/1967 | Cotton et al. | |
| 3,398,095 A | * | 8/1968 | Judd ........................... 508/250 |
| 3,836,077 A | | 9/1974 | Skildum | |
| 3,887,481 A | | 6/1975 | Korpics | |
| 4,051,066 A | * | 9/1977 | Miksic et al. ............. 252/389.5 |
| 4,124,549 A | * | 11/1978 | Hashiudo et al. ............. 524/563 |
| 4,275,835 A | * | 6/1981 | Miksic et al. .................. 239/60 |
| 4,290,912 A | | 9/1981 | Boerwinkle et al. | |
| 4,973,448 A | | 11/1990 | Carlson et al. | |
| 5,209,869 A | * | 5/1993 | Miksic et al. .......... 252/389.54 |
| 5,332,525 A | * | 7/1994 | Miksic et al. .......... 252/389.54 |
| 5,716,443 A | * | 2/1998 | Kijima et al. ........... 106/287.11 |
| 6,540,959 B1 | * | 4/2003 | Reinhard et al. ................ 422/8 |
| 6,752,934 B2 | | 6/2004 | Reinhard et al. | |
| 7,357,962 B2 | * | 4/2008 | Katsuta et al. ............. 427/409 |
| 2003/0234184 A1 | * | 12/2003 | Liu et al. ..................... 205/680 |
| 2006/0163528 A1 | * | 7/2006 | Wenderoth et al. ............ 252/73 |
| 2007/0145334 A1 | * | 6/2007 | Numbu et al. ............... 252/388 |

FOREIGN PATENT DOCUMENTS

| | | |
|---|---|---|
| DE | 814 725 | 9/1951 |
| DE | 1 172 924 | 6/1964 |
| DE | 1 182 503 | 11/1964 |
| DE | 268 978 | 6/1989 |
| DE | 284 254 | 11/1990 |
| DE | 284 255 | 11/1990 |
| DE | 295 668 | 11/1991 |
| DE | 4040 586 | 6/1992 |
| DE | 43 23 907 | 1/1995 |
| DE | 101 37 130 | 3/2003 |
| EP | 0 229 440 | 7/1987 |
| EP | 0 573 287 | 12/1993 |
| EP | 0 662 527 | 7/1995 |
| EP | 1 049 753 | 11/2000 |
| GB | 849 110 | 9/1960 |
| JP | 61015988 | 1/1986 |
| JP | 62063686 | 3/1987 |
| JP | 62109987 | 5/1987 |
| JP | 63-210285 A * | 8/1988 |
| JP | 02085380 | 3/1990 |
| JP | 03079781 | 4/1991 |
| JP | 2001-31966 A * | 2/2001 |

OTHER PUBLICATIONS

Derwent-Acc-No. 1992-250784, abstract of German Patent Specification No. DD298662A5 (Mar. 1992).*
Derwent-Acc-No. 2008-F78391, abstract of Korean Patent Specification No. 2007-117170 (Dec. 2007).*
G. Reinhard, "Korrosionsschutz durch Zusaetze zum einwirkenden Medium", Korrosion und Korrosionsschutz ( Egon Kunze), vol. 3, Sub-Section 4.1, Wiley-VCH, Berlin, Weinheim, New York 2001, pp. 1680-1714.
E. Vuorinen et al., "Introduction to Vapour Phase Corrosion Inhibitors in Metal Packaging", Surface Engineering vol. 20, No. 4, Aug. 2004, pp. 281-284.

* cited by examiner

*Primary Examiner*—Anthony J Green
(74) *Attorney, Agent, or Firm*—Pearl Cohen Zedek Latzer, LLP

(57) ABSTRACT

The present invention relates to new substance combinations as vapor phase corrosion inhibitors for protecting a broad range of customary utility metals, including iron, chromium, nickel, tin, zinc, aluminum, copper, magnesium and their alloys, against corrosion in humid climates. Said substance combinations comprise (1) at least one $C_6$ to $C_{10}$ aliphatic monocarboxylic acid, (2) at least one $C_6$ to $C_{10}$ aliphatic dicarboxylic acid, and (3) a primary aromatic amide. Preferably they further comprise (4) an aliphatic ester of hydroxybenzoic acid, in particular of 4-hydroxybenzoic acid, and/or (5) a bemzimidazole, in particular a benzimidazole substituted on the benzene ring.

21 Claims, No Drawings

VAPOR PHASE CORROSION INHIBITORS AND METHOD FOR THEIR PRODUCTION

CROSS-REFERENCE TO RELATED APPLICATIONS

This application claims priority from German Patent Application No. DE 10 2007 059 726.8, filed on Dec. 12, 2007, which is incorporated in its entirety herein by reference.

FIELD OF THE INVENTION

The present invention relates to substance combinations as vapor phase corrosion inhibitors (corrosion inhibitors capable of evaporating or sublimating, vapor phase corrosion inhibitors VPCI, volatile corrosion inhibitors VCI) for protecting customary utility metals, such as iron, chromium, nickel, tin, zinc, aluminum, copper, magnesium and their alloys, against corrosion in humid climates.

BACKGROUND OF THE INVENTION

Already for several decades, use has been made of corrosion inhibitors which tend to evaporate or sublimate even under normal conditions and thus can pass via the gas phase onto metal surfaces that are to be protected, for the temporary corrosion protection of metal objects within closed spaces, e.g. in packagings, switch cabinets or display cases. This manner of protecting metal parts against corrosion during storage and transport is the clean alternative to temporary corrosion protection using oils, greases or waxes and is becoming more important with the increasing globalization of national economies.

It is known that all measures of temporary corrosion protection for protecting metals against the effects of neutral aqueous media or condensed water films have the aim of preserving the primary oxide layer (POL), which is always present on utility metals after first contact with the atmosphere, against chemical and mechanical degradation (cf. e.g.: E. Kunze (ed.), Korrosion und Korrosionsschutz, Vol. 3, Wiley-VCH, Berlin, Weinheim, New York 2001, page 1680 ff.).

This is because the initial reactions of the corrosion of metals (Me) in aqueous media always consist of a selective or general degradation of the respective POL, generally formulated as follows for example:

$$MeO + 2H_2O \rightarrow Me(OH)_2 \rightarrow Me^{2+} + 2OH^- \quad (1)$$

before the exposed metal can be oxidized in subsequent steps, e.g.:

$$Me \rightarrow Me^{2+} + 2e^- \quad (2)$$

$$\tfrac{1}{2}O_2 + H_2O + 2e^- \rightarrow 2OH^- \quad (3)$$

$$Me + \tfrac{1}{2}O_2 + H_2O \rightarrow Me^{2+} + 2OH^- \quad (4)$$

One possibility for delaying these sub-steps to a greater or lesser extent by volatile corrosion inhibitors (VCI) and thus achieving a temporary corrosion protection consists in using amines.

Amines as organic derivatives of ammonia $NH_3$ react as a base during hydrolysis, e.g.:

$$NH_3 + H_2O \leftrightharpoons NH_4^+ + OH^- \quad (5)$$

thereby producing, in addition to the hydroxyl ions $OH^-$, also ions of the generally formulated type $NRH_3^+$, $NR_2H_2^+$ or $NR_3H^+$, depending on whether primary ($NRH_2$), secondary ($NR_2H$) or tertiary ($NR_3$) amines are used.

With this additional formation of $OH^-$ ions, at least two effects can be achieved:
 a limiting of the tendency of the POL to disintegrate (suppressing of reaction (1)) and
 a hindering of the oxygen reduction after reaction (3) as a cathodic sub-step of the corrosion reaction (4).

Since many amines already have a vapor pressure or sublimation pressure under normal conditions, their use as VCIs is obvious and is described in many patents. Mention is made primarily therein of the cyclic amines dicyclohexylamine and cyclohexylamine. In the U.S. Pat. Nos. 600,328, 2,419,327, 2,432,839, 4,051,066, 4,275,835, DD 284 254 and DD 284 255 cited by way of example, account is already taken of the fact that no reliable temporary corrosion protection can be achieved with amines alone, and therefore the use of amines is combined with substances capable of acting as passivators. As a result, it is possible to recreate the POL spontaneously as an oxidic top layer on metal substances when it has been destroyed by partial chemical disintegration or local mechanical removal (abrasion, erosion) (cf. e.g.: E. Kunze, loc. cit.; E. Vuorinen, E. Kalman, W. Focke, Introduction to vapour phase corrosion inhibitors in metal packaging, Surface Engineering, Vol. 20 (2004) 281ff.)).

As such passivating oxidation agents, the nitrites as salts of nitrous acid have proven useful in practical corrosion protection. They have therefore also been used for a long time as VCIs. In particular, the relatively readily volatile dicyclohexylammonium nitrite has already been used as a VCI for more than 60 years (cf. e.g. Kunze, loc. cit.; Vuorinen et al, loc. cit.) and is mentioned as a component of VCI compositions in numerous patents (e.g.: U.S. Pat. Nos. 2,419,327, 2,432,839, 2,432,840, 2,534,201, 4,290,912, 4,973,448, JP 02085380, JP 62109987, JP 63210285 A, DE 4040586).

The effect of the nitrite ion as an oxidation agent is associated with its electrochemical reduction, e.g. as follows:

$$2NO_2^- + 2H^+ + 2e^- \rightarrow 2NO + 2OH^- \quad (6)$$

Since hydroxyl ions, $OH^-$, are produced in the process, the reduction in aqueous media proceeds less intensively the higher already the pH of this medium.

With regard to this aspect, it is disadvantageous that values around pH≈9 are set in water at room temperature due to the dicyclohexylamine or the dicyclohexylammonium ions produced as a result of dissociation of the dicyclohexylammonium nitrite. This is moreover not only a hindrance to the development of the passivator effect of the nitrite but also places at risk for example the stability of the passive oxide layer of zinc and aluminum materials. It is known that the oxides of these metals are resistant only in the neutral range and disintegrate increasingly at pH>8 with formation of zincate or aluminate.

With the aim of creating VCI packaging materials which can be used not only for ferrous metals but rather at least also for galvanized steels and aluminum materials, attempts have been made to formulate VCI combinations which contain not only amine nitrites but also components which have a pH-regulating effect in condensed water films on metal surfaces, so that no disintegration of passive oxide layers takes place.

It has therefore been proposed to combine nitrite amine mixtures with other substances capable of sublimating, such as for example the salts of medium-to-weak, saturated or unsaturated carboxylic acids, cf. e.g. U.S. Pat. Nos. 2,419, 327, 2,432,839, 2,432,840, DE 814 725. As a result, an improved protection of customary Al and Zn materials is achieved when these are in contact with an aqueous medium or condensed water film; at the same time, however, the passivator properties of the nitrite are reduced by this species.

It is known that the carboxylates in question build up pH buffer systems with a relatively high buffer capacity in aqueous media or condensed water films on metal surfaces with or without the simultaneous presence of an amine, depending on the respectively present carboxylic acid/salt system, and thus hinder the reducibility of oxidation agents, which can be seen in principle from the above reduction reaction for nitrite (6). As is known, this reaction which is necessary for the passivation effect proceeds freely from left to right only if the respective reaction medium does not already have a correspondingly high concentration of OH ions or the resulting $OH^-$ ions are regularly discharged from the medium.

If these conditions do not exist, then the passivation effect can be achieved only if the concentration of the oxidation agent in the medium is set in comparative terms to be much higher than the $OH^-$ ions produced, for example by continuously supplementing reacted quantities of the oxidation agent from a depot.

All the inventions which propose VCI combinations containing, in addition to an oxidation agent such as nitrite, chromate or an organic nitro compound, also an amine or amine carboxylate can therefore be successful for practical use only if the passivating oxidation agent is used in excessive concentrations relative to the quantity of the other active substances. However, this fact is not always readily clear from the patents in question, since the concentration ranges in which the VCI combinations according to the invention can be used are usually specified in very broad terms. Such VCI combinations containing oxidation agents are described e.g. in U.S. Pat. No. 600,328, where it is recommended to use as much of an organic nitrite salt as possible, and in DE 814 725, in which nitrite salts of organic nitrogen-containing bases (e.g.: carboxylates, piperidines, oxazines or morpholines) are proposed on condition that at least 0.5 to 20 g of the nitrite are to be applied per $m^2$ of packaging material, and reliable protection is achieved only once at least 35 to 600 g have been emitted per $m^3$ of internal space of the packaging.

Since nowadays the practical use of said oxidation agents is regulated due to their known more or less damaging effect on humans and the environment, and since there are occupational exposure limits (OELs) which must be adhered to with regard to the concentration in preparations (cf. e.g. classification of substances and preparations according to EC Directive 67/548/EEC including annual updates), said VCI combinations containing excessive quantities of passivator can no longer be used.

As a replacement for these, it has been proposed for example in U.S. Pat. Nos. 5,209,869, 5,332,525 and EP 0 662 527 A1 to combine the VCI mixtures consisting of nitrites and amine carboxylates with or without molybdate with a desiccant such as silica gel, so that the formation of a condensed water film on the metal surface to be protected and the associated disadvantageous pH effect are delayed for as long as possible. However, this proposal has the significant disadvantage that the VCI system fixed on or in the packaging material tends to absorb considerable amounts of water from the environment due to the presence of the desiccant, which in turn leads to an impairment of the emission rate of the VCI components in the interior of closed packages and thus to a reduction of the VCI corrosion protection effect.

Most of the VCI systems known to date, which contain simultaneously a nitrite and an amine, are unable to provide the necessary reliability for the reasons already mentioned above. Another factor of uncertainty has in the meantime proven to be the fact that particularly the secondary amines and cyclic nitrogen-containing compounds, such as e.g. morpholine and piperidine, which are introduced as VCI components are easily converted to N-nitroso compounds. These N-nitrosamines usually act as weak oxidation agents and promote the corrosion of the metals. Much more disadvantageous, however, is their carcinogenic effect, which prevents these VCI systems from being used on an industrial scale.

It was first attempted to overcome this disadvantage by replacing the nitrite with another oxidation agent, since it was to be presumed that the nitrosation of the amines is caused only by the simultaneous presence of nitrite. In U.S. Pat. No. 4,051,066, therefore, m-nitro- and dinitrobenzoate are used instead of the nitrite, whereas DD 268 978 and DD 295 668 propose the use of dicyclohexylamine-o-nitrophenolate and dicyclohexylamine-m-nitrobenzoate. Finally, U.S. Pat. No. 1,224,500 generalizes regarding the use of volatile aliphatic and aromatic nitro compounds together with heterocyclic amines and mentions 2-nitropropane, nitrobenzene and dinitrobenzene specifically.

On the one hand, however, the passivator properties of these alternative oxidation agents proved to be much weaker than those of nitrite, and on the other hand the intended effect was not achieved, i.e. avoiding the formation of N-nitrosamine with the amines used. In the meantime it has become known that such well-proven VCI components, such as morpholine and dicyclohexylamine, undergo nitrosation simply due to the normal constituents of air, in particular upon contact with metals and at relatively high temperatures. In practice, this prevents them from being incorporated in plastics since, as is known, melt extrusion, injection molding or extrusion blow molding takes place at temperatures around 200° C. in metal machines.

In order to satisfy the demand for films and hard plastics equipped with VCIs to cope with overseas transport, the use of amine-free, nitrite-containing VCI systems has been proposed. For example, U.S. Pat. No. 3,836,077 mentions the combination of nitrite with borate and a phenol which is mono-, di- or trisubstituted with styrene. However, the VCI corrosion protection effect remains minimal since neither the borate nor the aromatically substituted phenols sublimate out of the polymeric carrier materials.

U.S. Pat. No. 4,290,912, on the other hand, emphasizes the use of inorganic nitrites in combination with a trisubstituted phenol and silica gel for the production of VCI films, but the examples of embodiments show that, in the case of phenols, only aliphatically substituted phenols and especially 2,6-di-tert-butyl-4-methylphenol (butylated hydroxytoluene, BHT) are meant. Since these substituted phenols tend to sublimate even at normal temperature, an improved sublimation rate was able to be achieved with this combination for nitrite without the involvement of a volatile amine, but the nitrite reaching the metal surface cannot provide reliable VCI corrosion protection without the use of further components. In the case of passivating metals, it is known to be necessary to also use components which adjust the pH in condensed water films in a range which is favorable for passivation and which stabilize the resulting passive oxide layer by adsorption to prevent disintegration (cf. e.g. E. Kunze, loc. cit.), something which is not achieved with the active substance combinations claimed in U.S. Pat. No. 4,290,912. Furthermore, in the case of copper materials in neutral aqueous solutions, the nitrite causes blackening due to the formation of the oxide CuO.

Benzotriazole has long been used specifically for protecting copper and copper alloys against atmospheric corrosion (cf. e.g. Kunze, loc. cit.). However, since the tendency of this compound to sublimate is relatively low, it is proposed in DE 1182503 and U.S. Pat. No. 3,295,917 firstly to set the depot of this VCI to a higher temperature (up to approx. 85° C.) and at the same time to cool the metal objects on which the condensation is to take place. On the other hand, U.S. Pat. Nos. 2,941,953 and 3,887,481 describe the impregnation of paper with benzotriazole and/or tolyltriazole. Organic solvents such as tetrachloroethylene are used, and it is specified that the metal parts to be protected should be wrapped as closely and as tightly as possible with the VCI packaging material thus impregnated, in order to keep as small as possible the distance between the VCI depot and the metal surface to be protected. However, this technology has the disadvantage that the active substance in the form of extremely fine powder particles adheres to the paper only slightly and can easily slip off, so that the corrosion protection properties of this packaging material cannot be reliably configured. Furthermore, they would remain limited exclusively to copper materials.

In order to provide VCI-emitting packaging materials which can be used for the corrosion protection of various metals, a wide range of combinations of active substances have already been proposed. In this regard, EP 0662527 mentions mixtures of benzotriazole with cyclohexylamine benzoate and ethylamine benzoate or with anhydrous sodium molybdate and dicyclohexylamine nitrite, U.S. Pat. No. 4,051,066 and UD 4,275,835 mention mixtures of benzotriazole with ammonium molybdate and amine molybdates, amine benzoates and amine nitrates, U.S. Pat. No. 4,973,448 mentions mixtures of benzotriazole with organic carbonates, phosphates and amines, and finally JP 62063686 and 63210285 A mention mixtures of benzotrizaole with alkali and amine salts of aromatic carboxylic acids.

Combinations of benzotriazole, tolyltriazole or methylbenzotriazole with other nitrogen-organic volatile solids are described e.g. in JP 62109987, JP 61015988, DD 268978 and DD 298662. It is disadvantageous that all the ammonium ion-containing components and amine-containing components, due to their more or less pronounced tendency to form complexes with metal ions, reduce the protective effect of triazoles, in particular with regard to nonferrous metals. In addition, said amines and ammonium compounds are highly hydrophilic. VCI depots which contain such substances tend to absorb more water. Their hydrolysis then usually leads to a greater reduction in their tendency to sublimate, which inevitably results in a reduction in the corrosion protection effect.

In order to benefit from the advantages of using VCIs and the inhibitor effect of the triazole structure, it is proposed in JP 03079781 to use only alkylaminotriazoles instead of the triazole/amine substance combinations. In fact, the explicitly mentioned substances 3-amino-1,2,4-triazole and 3-amino-5-methyl-1,2,4-triazole have a higher rate of volatilization, but do not have such a clear corrosion protection effect as benzotriazole and tolyltriazole, in particular with respect to copper.

Moreover, the proposed alkylaminotriazoles would in any case not be suitable for use alone as corrosion inhibitors for the wide range of utility metals.

VCI-emitting packaging materials, which are said to be suitable for the temporary corrosion protection of both ferrous and nonferrous metals, consist according to DE 101371130 and U.S. Pat. No. 6,752,934 B2 of substance combinations which contain, in addition to a nitrite, also water-insoluble, polysubstituted phenols, aliphatic esters of a dihydroxybenzoic acid, and tocopherol (2,5,7,8-tetramethyl-2-(4',8',12'-trimethyltridecyl) chroman-6-ol. With the organic components of these combinations, the largest surface region of the metal parts to be protected is coated with a hydrophobicizing adsorption film, so that the passivating effect of the nitrite has to be provided only on the few surface regions of the metal parts on which no adsorption took place.

Since both polysubstituted phenols and also tocopherols can act as antioxidants, Cu and silver base materials within the packaging materials from which such a substance combination is emitted moreover remain free of black or dark gray tarnish films. However, one condition for this is on the one hand that the surfaces of the metal parts to be protected are in a dry, hydrophobicizable condition at the time of packing and a relative humidity which is as low as possible ($\leqq 60\%$ at 20° C.) prevails in the packing area. Furthermore, it must be ensured that not only the nitrite but also the antioxidants sublimate out of the respective packaging material and are adsorbed as a thin film onto the metal surfaces to be protected. Although DE 101371130 provides for this reason that a bicyclic terpene or aliphatically substituted naphthalene is added as a further component, which is intended to help said VCI components to always be emitted to a sufficient degree even at relatively low temperatures, account must be taken of the fact that this is not done in all cases. Therefore, failures of the VCI corrosion protection when these packaging materials are used in areas with higher relative humidities and in the case of Cu base materials are not ruled out.

DETAILED DESCRIPTION OF THE PRESENT INVENTION

The object of the invention is to provide corrosion-inhibiting substances and substance combinations capable of evaporating or sublimating which are improved compared to the abovementioned disadvantages of conventional volatile corrosion inhibitors which act via the vapor phase, which substances and substance combinations evaporate or sublimate at a sufficient rate out of a corresponding depot in particular under the climatic conditions of interest in practice within technical packages and similar closed spaces and, after adsorption and/or condensation on the surface of metals located in this space, ensure conditions there under which the customary utility metals are reliably protected against atmospheric corrosion. The object of the invention is also to provide methods for producing and processing such substances and substance combinations for the production of improved VCI packaging materials.

Suprisingly, these objects were able to be achieved in particular by providing the substance combination according to the present invention. More specific aspects and preferred embodiments of the invention form the subject matter of the further claims.

The substance combination according to one embodiment of the invention comprises inter alia the following components:

(1) at least one C6 to C10 aliphatic monocarboxylic acid, and
(2) at least one C6 to C10 aliphatic dicarboxylic acid.

It has been found according to the invention that the combination of at least one monocarboxylic acid and of at least one dicarboxylic acid of medium chain length ($C_6$ to $C_{10}$) results in a good corrosion-inhibiting effect for many metals. The two components assist one another synergistically with regard to the adsorption onto metal surfaces covered with a primary oxide layer (POL), and as a result considerably stabilize these passive oxide layers against the effect of humidity and condensed water.

The corrosion-inhibiting substance combination, according to one embodiment of the invention, also comprises a further component (3), namely an aromatic primary amide, which surprisingly additionally aids the adsorption of the respective monocarboxylic and dicarboxylic acids onto oxide-covered metal surfaces.

It is preferable if the corrosion-inhibiting substance combination according to the invention contains, in addition to the monocarboxylic and dicarboxylic acids or preferably in addition to the monocarboxylic and dicarboxylic acids (1+2) and the amide (3), also at least one further component (4) and/or a component (5).

Component (5) is a benzimidazole, preferably a benzimidazole substituted on the benzene ring. Surprisingly, this component significantly inhibits the attack of the atmospheric oxygen in neutral aqueous solutions or humid air in particular on Cu metals, and thus ensures that the corrosion protection effect of the substance combinations according to the invention can be fully obtained on all customary utility metals in the technical state.

Preferably, the corrosion-inhibiting substance combination according to the invention contains, in addition to the above components (1)+(2), (1)+(2)+(5) or preferably (1)+(2)+(3) or (1)+(2)+(3)+(5), also an aliphatic ester of hydroxybenzoic acid, preferably of 4-hydroxybenzoic acid, as component (4) which itself sublimates readily in humid air and can act as a carrier for the sublimating VCI components. This component is of considerable benefit in particular in the case of paper-based corrosion-inhibiting packaging materials, but is also used with advantage in the case of corrosion-inhibiting plastic films.

The quantitative proportions of the different components may vary depending on the specific field of use, and suitable compositions can be ascertained by a person skilled in the art in this field without difficulty by routine experiments.

In one preferred embodiment of the invention containing all the components (1)-(5), the corrosion-inhibiting substance combination contains 1 to 60% component (1), 1 to 40% component (2), 0.5 to 20% component (3), 0.5 to 20% component (4) and 0.5 to 20% component (5).

Preferably, the composition is set in such a way that, in the temperature range up to 80° C. at relative humidities (RH) $\leq$98%, all the components evaporate or sublimate in a quantity and at a rate sufficient for vapor phase corrosion protection.

A few suitable, non-limiting examples of the $C_6$ to $C_{10}$ aliphatic monocarboxylic acid, which may be straight-chain or branched, preferably straight-chain, saturated or unsaturated, are hexanoic acid (capronic acid), 2,4-hexadienoic acid (sorbic acid), heptanoic acid (enanthic acid), octanoic acid (caprylic acid), 2-ethylhexanoic acid, nonanoic acid (pelargonic acid), isononanoic acid, decanoic acid (capric acid) or a similarly structured aliphatic monocarboxylic acid.

A few suitable, non-limiting examples of the $C_6$ to $C_{10}$ aliphatic dicarboxylic acid, which may be straight-chain or branched, saturated or unsaturated, are hexanedioic acid (adipic acid), heptanedioic acid (pimelic acid), nonanedioic acid (azelaic acid), decanedioic acid (sebacic acid) or a similar dicarboxylic acid.

A few suitable, non-limiting examples of the aliphatic ester of hydroxybenzoic acid, preferably of 4-hydroxybenzoic acid, are methyl 4-hydroxybenzoate (methylparaben), ethyl 4-hydroxybenzoate (ethylparaben) or a similarly structured aliphatic ester.

A few suitable, non-limiting examples of the primary aromatic amide are benzamide, 2-aminobenzamide, 4-aminobenzamide, benzene aminoamide(N-benzylurea), pyridine-3-carboxamide (nicotinamide) or a similarly structured primary aromatic amide. Other suitable amides can be determined by the person skilled in the art without difficulty by routine experiments.

One preferred, non-limiting example of the benzimidazole is a benzimidazole substituted on the benzene ring, such as 5,6-dimethylbenzimidazole or a similarly structured, substituted benzimidazole. Other suitable compounds can be determined by the person skilled in the art without difficulty by routine experiments.

The corrosion-inhibiting substance combinations according to the invention may contain, in addition to one or more of the abovementioned components (1+2) to (5), additionally also substances which have already been introduced as vapor phase corrosion inhibitors, individually or as a mixture. By way of example, a triazole or a C-substituted triazole, e.g. a benzotriazole or tolyltriazole, may also be used for some applications (e.g. for protecting copper or copper alloys) instead of or in addition to the benzamidazole component (5).

The substance combination according to the invention can be produced in a simple manner by mixing together the components selected from (1) to (5) in the desired quantities (plus any additional components). In one preferred embodiment, 1 to 60% component (1), 1 to 40% component (2), 0.5 to 20% component (3), 0.5 to 20% component (4) and 0.5 to 20% component (5) are mixed together in this method.

According to the invention, these substance combinations are used directly in the form of suitable mixtures or are incorporated in the context of producing VCI packaging materials in accordance with methods known per se, so that these packaging materials act as a VCI depot and the corrosion protection properties of the substance combinations according to the invention can be obtained in a particularly advantageous manner.

In order to incorporate the substance combinations according to the invention in VCI depots or in packaging materials which act as such, it is advantageous firstly to mix together the individual substances in the anhydrous state as intensively as possible in the above ratios using methods known per se.

The substance combinations according to the invention are used in particular to protect the wide range of customary utility metals, including iron, chromium, nickel, tin, zinc, aluminum, copper, magnesium and their alloys, against atmospheric corrosion in packages, during transport and during storage in similar closed spaces. Specifically this ability to be used for a wide range of metals and metal alloys is a particular advantage of the invention.

The corrosion-inhibiting substance combination according to the invention can be used as a vapor phase corrosion inhibitor (VPCI, VCI) in the form of fine-powdered mixtures in the packing, storage or transport of metal materials.

However, the corrosion-inhibiting substance combination can also be incorporated in coating substances, in order thus to coat carrier materials, such as paper, cardboard, foams and similar flat structures, in the context of producing VPCI- or VCI-emitting packaging materials and then to use these within packing, storage and transport processes.

The corrosion-inhibiting substance combination according to the invention makes it possible to provide corrosion inhibitors which can be melt-extruded, injection-molded or extrusion blow-molded in the form of mixtures with polymeric materials (e.g. polyolefins, polyester) to form active substance concentrates (masterbatches) and flat end products, so that VPCI-emitting films or hard plastics are produced, the ability of which to emit corrosion inhibitors (VPCI, VCI) capable of evaporating or sublimating can be used within packing, storage and transport processes for the corrosion protection of metals.

The substance combinations according to the invention are in principle free of nitrites and amines and advantageously consist only of substances which can be processed easily and without any danger by methods known per se and in the quantities used can be classified as non-toxic and non-harmful to the environment. They are therefore particularly suitable for producing corrosion-protecting packaging materials which can be used on large scale inexpensively and without any risk.

The subject matter of the application will be explained in more detail by the following, non-limiting examples. As can be seen from the examples, the type and quantity of the individual components in the mixture according to the invention in the respective VCI depot depends only on the production conditions for the respective VCI-emitting product and not on the type of metal to be protected against corrosion.

EXAMPLE 1

The following substance combination VCI (I) according to the invention was prepared from the anhydrous substances:

| | |
|---|---|
| 20.0% by weight | octanoic acid |
| 15.0% by weight | 2,4-hexadienoic acid |
| 15.0% by weight | hexanedioic acid (adipic acid) |
| 10.0% by weight | 2-aminobenzamide |
| 5.0% by weight | 5,6-dimethylbenzimidazole |
| 35.0% by weight | inert filler (silica gel) |

In each case 5 g of this mixture were broadly distributed over the bottom of a 25 ml glass beaker and the latter was placed in a glass jar (capacity 1 l). A second glass beaker containing 10 ml of deionized water was positioned next to the first glass beaker. A test body frame was then introduced, on which in each case 4 purified test bodies had been positioned at an angle of 45° to the horizontal. In each batch, said test bodies were made from the materials low-alloy steel 100Cr6, cast iron GGG25, AlMg1SiCu and Cu—SF, free of tarnish films and deposits.

The glass jars containing the metal samples, the deionized water and the substance combination according to the invention were tightly closed, for which purpose use was made in each case of a lid with a sealing ring and also a tension clip. After a waiting time of 16 h at room temperature, the so-called buildup phase of the VCI components within the vessel could be regarded as complete. The individual glass jars were then exposed for 16 h in a heating cabinet at 40° C., then for a further 8 h at room temperature. This cyclic loading (1 cycle=24 h) was repeated until visual changes to the test bodies could be ascertained through the glass wall or a maximum loading of 42 cycles was complete.

After the end of the test, the test bodies were assessed visually in detail outside the glass jars.

In reference to the substance mixture VCI (1) according to the invention, 5 g portions of a commercially available VCI powder were tested in the same way. This reference VCI powder (R1) consisted of

| | |
|---|---|
| 54.0% by weight | monoethanolamine benzoate |
| 23.0% by weight | 1H-benzotriazole |
| 23.0% by weight | filler (silica gel) |

Result of the Test:

The test bodies which had been used together with the substance mixture VCI (1) according to the invention had an unchanged appearance after 42 cycles in all 4 parallel batches.

In the batches using the commercially available reference system R1, the test bodies made from GGG25 exhibited first spots of rust after 8 to 10 cycles, which quickly increased in size as the test continued. On the steel rings, rusting at the edges could be observed after 11 to 12 cycles.

The Al test bodies showed the beginnings of white rust after 42 cycles, particularly in the edge regions, which were able to be identified as aluminum oxide hydroxide (AlOOH) by means of FTIR microscopy (PerkinElmer FTIR measuring station Spectrum One FTIR with auto-image microscope system in conjunction with a diamond cell).

The reference system R1 is therefore suitable only for the VCI corrosion protection of Cu base materials. By comparison, the VCI effect of the substance combination VCI (1) according to the invention on the customary utility metals is demonstrated to great advantage in the described example.

EXAMPLE 2

The following substance combination according to the invention was prepared from the anhydrous substances:

| | |
|---|---|
| 25.0% by weight | octanoic acid |
| 15.0% by weight | 2,4-hexadienoic acid |
| 15.0% by weight | hexanedioic acid (adipic acid) |
| 5.0% by weight | methylparaben |
| 15.0% by weight | nicotinamide |
| 2.5% by weight | 5,6-dimethylbenzimidazole |
| 21.5% by weight | potassium hydroxide |
| 1.0% by weight | Natrosol ® 250 GR (hydroxyethylcellulose, dispersing agent, thickener) | and a 25% dispersion was prepared therefrom by adding deionized water.

Paper strips (Kraft paper 70 g/m$^2$) were coated with this preparation, using a wet application of 15 g/m$^2$. Immediately after air-drying of the resulting VCI paper VCI (2) according to the invention, said paper was tested for its corrosion-protecting effect compared to a commercially available corrosion protection paper serving as the reference system (R2). According to chemical analysis, the reference system (R2) contained the active substances ethanolamine benzoate, sodium benzoate/benzoic acid, benzotriazole and urea, the total amount being approximately twice as much as the substance combination according to the invention.

In a manner analogous to Example 1, test bodies made from low-alloy steel 100Cr6, cast iron GGG25, AlMg1SiCu and Cu—SF were again used, and the test ritual was also analogous to that described in Example 1. The only difference was that, instead of the VCI powder mixtures, the individual glass jars were now lined with the VCI paper, in each case 1 circular blank with Ø 8 cm at the bottom, a lateral surface of 13×28 cm and another circular blank with Ø 9 cm for the top. The test body frame and the glass beaker containing the deionized water were then placed in position, the glass jar was closed and the climate loading was carried out as described in Example 1.

However, since the condition of the test objects could now not be observed through the glass wall, the batches were briefly opened for this purpose after every fifth cycle during the room temperature phase. If no changes could be ascertained visually, the climate loading was continued in the described manner.

Result of the Test:

The various test bodies which had been used together with the VCI paper VCI (2) produced on the basis of the substance mixture according to the invention had an unchanged appearance after 42 cycles in all 3 parallel batches.

In the batches using the commercially available reference system R2, the test bodies made from GGG25 exhibited first spots of rust when inspected after 10 cycles, which quickly increased in size as the test continued. On the steel rings, rusting at the edges could be observed after 15 cycles.

The test bodies made from the Al alloy showed the beginnings of white rust at the edges after 30 cycles, which significantly increased in size during the loading up to 40 cycles. The test bodies made from Cu—SF were coated with a slight dark gray tarnish film after 40 cycles, which could not be wiped off.

The reference system R2 is therefore suitable only for the VCI corrosion protection of Cu base materials, while the VCI paper VCI (2) produced on the basis of the substance combination according to the invention exhibited reliable VCI properties on the customary utility metals even under the extreme humidity conditions and under long-term loading, as shown in the example.

EXAMPLE 3

| | |
|---|---|
| 12.7% by weight | octanoic acid |
| 8.6% by weight | nonanoic acid |
| 11.2% by weight | decanedioic acid |
| 11.2% by weight | 4-aminobenzamide |
| 6.8% by weight | methylparaben |
| 14.1% by weight | sodium octanoate |
| 14.3% by weight | silicic acid |
| 6.3% by weight | Silicate (antiblock additive) |
| 8.1% by weight | calcium carbonate |
| 6.7% by weight | IRGANOX ® B 215 (stabilizer) |

26.5% by weight of this mixture were mixed with 73.5% by weight of an EBA (ethylene/butyl acrylate copolymer) and processed to form a VCI masterbatch. To this end, use was made of a laboratory extrusion machine Rheocord 90 (HAAKE) with a co-rotating twin screw extruder. At the screw rotation speed of 65 to 80 rpm, this mixture was extruded at cylinder temperatures of 110 to 135° C. and a nozzle temperature of 135° C. and granulated by cold chopping. This granulated VCI masterbatch was further processed by blow film extrusion to form VCI films, for which purpose use was made of the laboratory extrusion machine Rheocord 90 (HAAKE) with a single screw extruder and a ring nozzle. After thoroughly mixing 2.5% by weight of the VCI masterbatch with 97.5% by weight of an LDPE suitable for blow film production, processing was continued at cylinder temperatures of 165-190° C. and a nozzle temperature of 195° C., the screw rotation speed being 100 rpm. A VCI film with an average layer thickness of 100 μm was produced (VCI (3)).

The VCI film VCI (3) thus produced using a substance combination according to the invention was processed to form bags (cutting and welding of the superposed side seams). Sheets of the materials carbon steel DC03, cold rolled, (90×50×1) mm³ (Q-Panel, Q-Panel Lab Products, Cleveland, Ohio 44145 USA), galvanized fine-grain steel (ZnSt) with an 18 μm Zn layer and the aluminum alloy A17075 in each case of the same size as the sheets DC03 were arranged parallel to one another at an approx. 1 cm spacing within spacer frames made from the chemically inert plastic PMMA (polymethyl methacrylate), and these arrangements were in each case welded separately into a pre-manufactured bag. The positioning of the various test sheets in plastic spacer frames ensured that the VCI components could carry out their effect as intended only via the gas phase.

As the reference system (R3), use was made of a commercially available VCI film which according to chemical analysis contained 2-amino-2-methyl-1-propanol (AMP), octanoic acid, 3,5,5-trimethylhexanoic acid, together with calcium carbonate and talcum, in total approximately the same quantity of the three first-mentioned substances as the VCI components in the substance combination VCI (3) according to the invention, and likewise had a layer thickness of 100 μm. As the reference system (R3'), similar packages were also prepared using VCI-free LDPE film, 100 μm, so as to detect separately the proportion of the corrosion protection effect lost due to the barrier effect of the 100 μm film.

All of the prepared model packages were buffer-stored for a further approx. 5 h at room temperature to ensure the establishment of an atmosphere saturated with VCI components (buildup phase!) in the packages prepared with VCI film.

The packages were then transferred to various climate-controlled test cabinets of the type VC 4033 (VÖTSCH Industrietechnik GmbH, D-72304 Balingen), which were set to the changing humidity/temperature climate according to DIN EN 60068-2-30. For the films VCI (3), R3 and R3' to be tested, separate climate-controlled test cabinets were used in each case in order to prevent any mutual influencing of the exposed samples.

In the applied climate loading, one 24 h cycle consists as is known of the following steps: 6 h 25° C. and (RH)=98%, 3 h heating phase from 25 to 55° C. at (RH)=95%, 9 h 55° C. at (RH)=93% and 6 h cooling phase from 55 to 25° C. at (RH)=98% and 3 h 25° C. and (RH)=98%.

Experience has shown that this changing humidity/temperature loading imitates the climatic conditions of overseas transport in an accelerated manner.

The surfaces of the test sheets surrounded by film packaging were inspected through the transparent film material after each cycle (within the stable 25° C. phase). As soon as visible corrosion phenomena could be ascertained on the individual test sheets, the number of cycles up to that point was recorded and then the climate loading was continued until all the test sheets of a model package were affected, or until the degree of corrosion on individual test sheets could no longer be assessed by visual inspection through the film walls. After the end of the test, the packaging material was removed and the surface condition of each test sheet was finally evaluated.

Result of the Test:

TABLE 1

Results of the changing humidity/temperature loading of model packages (mean values for number of cycles from 3 parallel samples in each case)

| Packages | Number of cycles according to DIN EN 60068-2-30 | Surface condition of the test sheets |
|---|---|---|
| R3' | 6 | DC03, first spots of rust in edge regions; |
| | 9 | ZnSt, spots of white rust in the edge region; |
| | 12 | Al 7075, small white spots on surfaces; |
| | 18 | Climate loading stopped since corrosion phenomena pronounced on all sheets |

TABLE 1-continued

Results of the changing humidity/temperature loading
of model packages (mean values for number of cycles
from 3 parallel samples in each case)

| Packages | Number of cycles according to DIN EN 60068-2-30 | Surface condition of the test sheets |
|---|---|---|
| VCI (3) | ended after 40 | All test sheets still free of visible changes |
| R3 | 15 | Al 7075, small white spots |
|  | 18 | ZnSt, spots of white rust in the edge region; |
|  | 22 | DC03, spots of rust distributed over the surfaces; |
|  | 28 | Climate loading stopped, further progress of the corrosion on test sheets could no longer be assessed visually with certainty; |

This example documents the superiority of the substance combination according to the invention as a high-performance VCI film packaging material for the corrosion protection of customary utility metals, while the reference system R3 was able to provide a satisfactory protective effect only on steel; on the nonferrous metal samples on the other hand, hardly any differences could be seen compared to the VCI-free reference system R3', consisting of a customary LDPE film of the same layer thickness of 100 μm.

EXAMPLE 4

| | |
|---|---|
| 9.4% by weight | nonanoic acid |
| 10.6% by weight | decanedioic acid |
| 11.2% by weight | methylparaben |
| 9.4% by weight | 2-aminobenzamide |
| 5.0% by weight | 5,6-dimethylbenzimidazole |
| 25.4% by weight | silicic acid |
| 25.2% by weight | silicate (antiblock additive) |
| 3.8% by weight | IRGANOX ® B 215 (stabilizer) |

26.5% by weight of this mixture were mixed with 73.5% by weight of an EBA (ethylene/butyl acrylate copolymer) and again processed to form a VCI masterbatch as described in Example 3.

2.5% by weight thereof were then mixed with 97.5% by weight of an LDPE suitable for blow film production and, as already described in Example 3, processed to form a VCI film having an average layer thickness of 100 μm (VCI (4)).

The VCI film VCI (4) thus produced using a substance combination according to the invention was likewise processed to form bags (cutting and welding of the superposed side seams). To prepare the model packages, in addition to the test sheets of the materials carbon steel DC03, cold rolled, (90×50×1) mm³ (Q-Panel, Q-Panel Lab Products, Cleveland, Ohio 44145 USA), galvanized fine-grain steel (ZnSt) with an 18 μm Zn layer and aluminum alloy Al7075, use was now also made of sheets of copper Cu—SF and preparation again took place in the same way as described in Example 3.

As the reference system (R4), use was made of a commercially available VCI film which is specifically recommended for protecting so-called multimetal combinations which also contain copper base materials. According to chemical analysis, R4 contained cyclohexylaminobenzoate, sodium nitrite and benzotriazole, in total approximately the same quantity as the VCI components in the substance combination VCI (4) according to the invention, and likewise had a layer thickness of 100 μm. As the reference system (R4'), similar packages were also prepared using VCI-free LDPE film, 100 μm, so as again to detect separately the proportion of the corrosion protection effect lost due to the barrier effect of the 100 μm film.

All of the prepared model packages were again buffer-stored for approx. 5 h at room temperature to ensure the establishment of an atmosphere saturated with VCI components (buildup phase!) in the packages prepared with VCI film.

In a manner analogous to Example 3, the packages were then transferred to various climate-controlled test cabinets of the type VC 4033, which were likewise set to the changing humidity/temperature climate according to DIN EN 60068-2-30. For the films VCI (4), R4 and R4' to be tested, separate climate-controlled test cabinets were used in each case in order to prevent any mutual influencing of the exposed samples.

The rest of the test was carried out as described in Example 3.

Result of the Test:

TABLE 2

Results of the changing humidity/temperature loading
of model packages (mean values for number of cycles
from 3 parallel samples in each case)

| Packages | Number of cycles according to DIN EN 60068-2-30 | Surface condition of the test sheets |
|---|---|---|
| R4' | 6 | DC03, first spots of rust in edge regions; |
|  | 9 | ZnSt, spots of white rust in the edge region; |
|  | 12 | Al 7075, small white spots on surfaces; |
|  | 15 | Cu—SF, spots of dark gray tarnish film; |
|  | 18 | Climate loading stopped since corrosion phenomena pronounced on all sheets |
| VCI (4) | ended after 40 | All test sheets still free of visible changes |
| R4 | 12 | Cu—SF, spots of dark gray tarnish film; |
|  | 19 | Al 7075, small white spots; |
|  | 22 | ZnSt, spots of white rust in the edge region; |
|  | 30 | Climate loading stopped, only DC03 still free of corrosion phenomena; |

This example likewise documents the superiority of the substance combination according to the invention. The test sheets of the Cu material Cu—SF in the packages of the reference system R4 exhibited a tarnish film even earlier than in the packages of the VCI-free reference system R4' having the same film thickness of 100 μm. The reference system R4 was able to provide a noticeable protective effect only on steel.

By contrast, the film VCI (4) produced using the substance combination according to the invention proved to be extremely suitable for corrosion protection on all the exposed materials. The various test sheets were still without any corrosion phenomena even after a relatively high climate loading of 40 cycles. This film VCI (4) is therefore predestined for use as a high-performance corrosion protection material for so-called multimetal combinations, consisting of customary steels and aluminum, zinc and copper base materials.

The invention claimed is:

1. A corrosion-inhibiting substance combination capable of evaporating or sublimating, which contains the following components:
   (1) 1 to 60% of at least one $C_6$ to $C_{10}$ aliphatic monocarboxylic acid,
   (2) 1 to 40% of at least one $C_6$ to $C_{10}$ aliphatic dicarboxylic acid,
   (3) 0.5 to 20% of a primary aromatic amide, and
   (4) 0.5 to 20% of an aliphatic ester of hydroxybenzoic acid.

2. The corrosion-inhibiting substance combination according to claim 1, which furthermore contains a benzimidazole.

3. The corrosion-inhibiting substance combination according to claim 2, wherein the benzimidazole is a benzene ring substituted benzimidazole.

4. The corrosion-inhibiting substance combination according to claim 1, wherein the hydroxybenzoic acid is 4-hydroxybenzoic acid.

5. The corrosion-inhibiting substance combination according to claim 2, further containing 0.5-20% benzimidazole.

6. The corrosion-inhibiting substance combination according to claim 1, in which all the components are capable of evaporating or sublimating in the temperature range up to 80° C. at relative humidities (RH)$\leqq$98%.

7. The corrosion-inhibiting substance combination according to claim 1, in which the $C_6$ to $C_{10}$ aliphatic monocarboxylic acid is selected from hexanoic acid (capronic acid), 2,4-hexadienoic acid (sorbic acid), heptanoic acid (enanthic acid), octanoic acid (caprylic acid), 2-ethylhexanoic acid, nonanoic acid (pelargonic acid), isononanoic acid, decanoic acid (capric acid) or a combination thereof.

8. The corrosion-inhibiting substance combination according to claim 1, in which the aliphatic dicarboxylic acid is selected from hexanedioic acid (adipic acid), heptanedioic acid (pimelic acid), nonanedioic acid (azelaic acid), decanedioic acid (sebacic acid) or a combination thereof.

9. The corrosion-inhibiting substance combination according to claim 1, in which the aliphatic ester of 4-hydroxybenzoic acid is selected from methyl 4-hydroxybenzoate (methylparaben), ethyl 4-hydroxybenzoate (ethylparaben) or a combination thereof.

10. The corrosion-inhibiting substance combination according to claim 1, in which the aromatic amide is selected from benzamide, 2-aminobenzamide, 4-aminobenzamide, benzene aminoamide (N-benzylurea), pyridine-3-carboxamide (nicotinamide) or a combination thereof.

11. The corrosion-inhibiting substance combination according to claim 2, in which the benzimidazole is selected from 5,6-dimethylbenzimidazole or a combination thereof with another benzimidazole substituted on the benzene ring.

12. The corrosion-inhibiting substance combination according to claim 1, which additionally contains other substances effective as vapor phase corrosion inhibitors, individually or as a mixture.

13. The corrosion-inhibiting substance combination according to claim 1 in the form of fine-powdered mixtures.

14. The corrosion-inhibiting substance combination according to claim 1 wherein the combination is incorporated into coating substances.

15. The corrosion-inhibiting substance combination according to claim 1 further mixed with at least one polymeric material.

16. The corrosion-inhibiting substance combination according to claim 15 wherein the polymeric material is a polyolefin, polyester, or a mixture thereof.

17. A method for corrosion protection of customary utility metals comprising the administration of the corrosion-inhibiting substance combination according to claim 1 to the metals or to their surroundings.

18. The method according to claim 17 wherein the customary utility metals are iron, chromium, nickel, tin, zinc, aluminum, copper, magnesium and their alloys.

19. A method for packing, storage or transport of metal materials by adding the corrosion-inhibiting substance combination of claim 1 into the packing, storage or transport substances.

20. A method for producing a corrosion-inhibiting substance combination capable of evaporating or sublimating, in which (1) one or more $C_6$ to $C_{10}$ aliphatic carboxylic acids, (2) one or more $C_6$ to $C_{10}$ aliphatic dicarboxylic acids, (3) one primary aromatic amide or more, (4) an aliphatic ester of hydroxybenzoic acid and optionally (5) a benzimidazole are mixed together.

21. The method according to claim 20, in which 1 to 60% component (1), 1 to 40% component (2), 0.5 to 20% component (4), 0.5 to 20% component (4) and 0.5 to 20% component (5) are mixed.

* * * * *